Sept. 13, 1938.   S. H. JUUL   2,129,939
PROPELLER FOR AIRCRAFT
Filed July 17, 1937
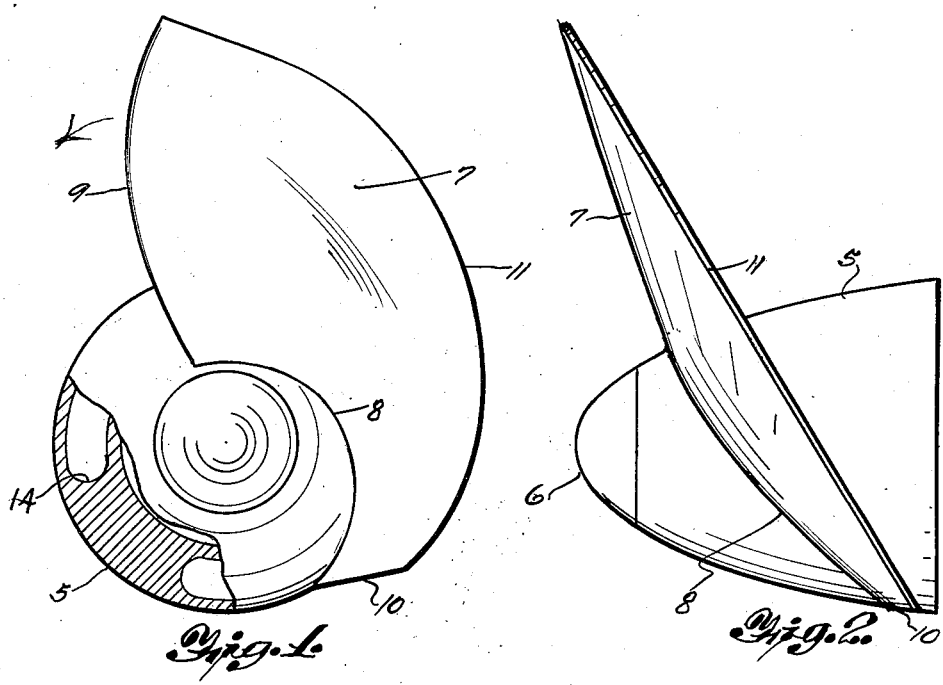
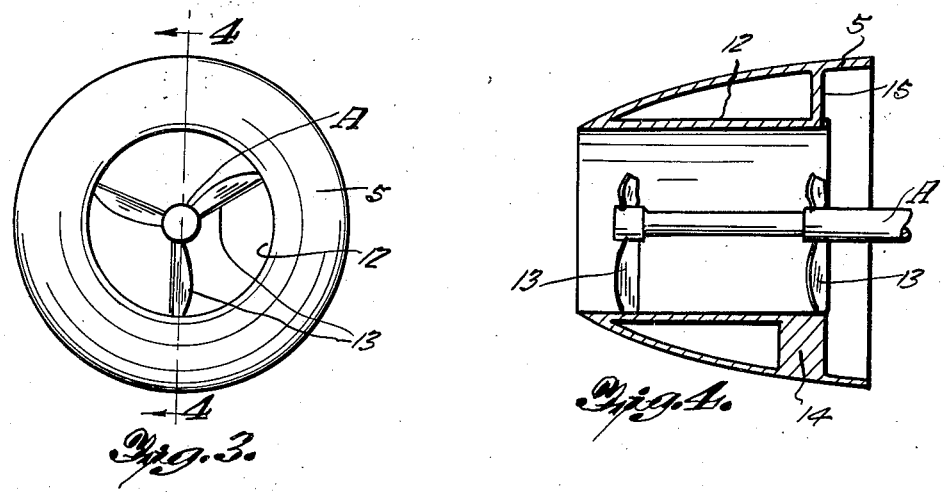
Inventor
S. H. Juul
By Adam E. Fisher
Attorney Patented Sept. 13, 1938

2,129,939

UNITED STATES PATENT OFFICE 2,129,939

PROPELLER FOR AIRCRAFT

Soren H. Juul, Outlook, Mont.

Application July 17, 1937, Serial No. 154,124

1 Claim. (Cl. 170—159)

My invention relates to propellers of aircraft. The main object is to provide a propeller which is efficient, compact and durable.

Another object is to provide a propeller in which but a single blade is used and the same takes the form of a relatively thin metal wing or fan which is supported on a conical hub member in an inclined or spiral position so that as this hub turns the leading edge of the fan will cut through the air and carry the same backward so as to exert the necessary tractive or pulling force.

Another object is to provide a propeller of this kind in which the single blade or fan is counterbalanced by a weight located inside the hub so as to prevent any uneven torque which might otherwise occur.

Another object is to provide a propeller of this kind in which the interior of the hub is provided with a cylindrical air chamber extended coaxially with the motor drive shaft and opening at both its frontal and rear ends, and in which are located (one or more) fan blades which act to draw air to the hub and carry same to the motor for cooling purposes.

With these and other objects in view the invention resides in the novel construction and arrangement of parts as hereinafter fully set forth and claimed, reference being had to the accompanying drawing as showing a preferred embodiment of my invention for purposes of exemplification.

In the drawing:

Figure 1 is a frontal view of the propeller.

Figure 2 is a side elevation.

Figure 3 is a frontal view of the hub alone, same being shown as open at the frontal end for air cooling purposes.

Figure 4 is a cross section along line 4—4 in Figure 3.

In carrying out my invention I provide the hub 5 which is of conical shape with its circumferential surfaces rounded off forwardly and parabolically to the rounded nose 6. This hub may be mounted in any usual manner on the propeller drive shaft so as to rotate therewith. The propeller blade 7, only one of which is used, is made up from relatively thin sheet material or metal cut and formed to the substantially elliptical shape shown with one margin 8 cut out arcuately and welded or otherwise secured to the circumference of the hub 5. This line of connection or juncture between the propeller 7 and hub 5 takes a spiral course from adjacent the frontal end of the hub to the rear thereof as shown in Figures 1 and 2. The leading edge 9 of the propeller 7 then inclines forwardly and radially from the center of the hub and is curved off arcuately and sharpened so as to enter and cut through the air with little effort. From this leading edge 9 the body of the propeller 7 leads in a spiral direction around the hub and decreases gradually in width to its relatively narrow trailing edge 10. The outer edge 11 of the propeller when viewed from the side (Figure 2) is extended in a straight line whereby the propeller is given an arcuate transverse cross section with the convex face turned forwardly.

The propeller thus formed is well adapted to cut through the air with little effort and to set the air in a rearwardly whirling motion creating a very powerful thrust as required for pulling the aircraft through the air. The propeller as a whole may be very compact and by proper proportioning of its area and shape and by varying its angle of inclination both forwardly and radially any desired thrust may be obtained.

As shown in Figures 3 and 4 the nose portion 6 of the hub 5 is removable and the hub has a cylindrical inner casing 12 which is formed integrally with the hub. This casing opens at both its frontal and rear ends and when the nose 6 is removed, of course the air will rush through the casing. The drive shaft A for the propeller extends centrally and axially into the casing 12 and is supported therein by the radially extended arms 13. These arms 13 take the form of fan blades which are so set and located that an actual air blast will be set up in and drawn through the casing by action of these blades as the propeller turns. As here shown two sets of blades 13 are used, one being located adjacent to the frontal end of the casing 12 and the other at the rear end, but of course obviously any number may be employed as desired. Thus by removing the nose 6 of the hub 5 the engine of the aircraft (not shown) may be cooled by air forced through the hub and this permits the use of cowling between the hub and the motor nacelle to reduce air resistance thereat in a well known manner.

To prevent uneven torque due to the eccentric position of the single propeller blade the interior of the hub 5 may be built up at a point opposite the blade as shown at 14 in Figures 1 and 4, the increased weight thus counterbalancing the weight of the propeller blade. Inasmuch as the casing 12 must be supported at its rear end inside the hub 5 this counterbalancing weight 14 may be expeditiously used as one support therefore supplementing relatively narrow spokes or webs 15 also shown in Figure 4.

While I have herein set forth a certain preferred embodiment of my invention it is understood that I may vary from the same in minor structural details so as best to provide a practical device for the purposes intended, not departing from the spirit of the invention and within the scope of the appended claim.

I claim:

In a propeller, a hub of conical shape with its circumferential surfaces rounded off forwardly and parabolically into a rounded nose, a propeller blade of thin sheet material formed substantially to an elliptical shape with its predetermined inner margin cut out arcuately at the end designed for attachment to the hub, and thereby secured eccentrically to the circumference of the hub rearwardly of the nose, the line of juncture between propeller and hub taking a spiral course from adjacent the nose of the hub to the rear of the hub, the leading edge of the propeller being inclined forwardly and radially from the center of the hub and being curved off arcuately and sharpened for effectively cutting through the air, the body of the blade rearwardly of the leading edge trailing in a spiral direction around the hub and narrowing in width to a relatively narrow trailing edge at the opposite side of the hub from the leading edge, the outer edge of the blade when viewed from the side lying in a straight line, and so constructed and arranged that the propeller is given an arcuate transverse cross section with the convex face turned forwardly, a shaft-mounting tubular member within the casing extending from the front toward the rear thereof, support members between the tubular member and the casing located adjacent the rear end of the tubular member, one of the support members being heavier than the remaining support members and located at a point opposite to the said blade so as to function as a counterweight.

SOREN H. JUUL.